(12) United States Patent
Kawata et al.

(10) Patent No.: US 7,508,475 B2
(45) Date of Patent: Mar. 24, 2009

(54) LIQUID CRYSTAL DISPLAY DEVICE

(75) Inventors: Yasushi Kawata, Ageo (JP); Akio Murayama, Fukaya (JP); Masaki Obi, Ageo (JP); Kisako Ninomiya, Fukaya (JP); Norihiro Yoshida, Kumagaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 214 days.

(21) Appl. No.: 11/621,265

(22) Filed: Jan. 9, 2007

(65) Prior Publication Data
US 2007/0165166 A1 Jul. 19, 2007

(30) Foreign Application Priority Data
Jan. 17, 2006 (JP) .............................. 2006-008912

(51) Int. Cl.
*G02F 1/1337* (2006.01)
(52) U.S. Cl. ..................... 349/129; 349/139; 349/145
(58) Field of Classification Search ................ 349/129, 349/144, 145, 139, 123, 143
See application file for complete search history.

(56) References Cited

U.S. PATENT DOCUMENTS 5,953,093 A * 9/1999 Hirata et al. ................ 349/143

7,253,856 B2 * 8/2007 Kim et al. ................... 349/110
2007/0165166 A1 7/2007 Kawata et al.

FOREIGN PATENT DOCUMENTS

JP 6-43461 2/1994

OTHER PUBLICATIONS

U.S. Appl. No. 11/621,265, filed Jan. 9, 2007, Kawata et al.
U.S. Appl. No. 11/668,238, filed Jan. 29, 2003, Yoshida et al.
U.S. Appl. No. 12/028,526, filed Feb. 8, 2008, Yoshida et al.

* cited by examiner

*Primary Examiner*—Thoi V. Duong
(74) *Attorney, Agent, or Firm*—Oblon, Spivak, McClelland, Maier & Neustadt, P.C.

(57) ABSTRACT

A liquid crystal display device comprises a first substrate including a first insulation substrate, and rectangular pixel electrodes provided in a matrix on the first insulation substrate and elongated in a first direction, a second substrate opposing the first substrate, and including a second insulation substrate, a counter electrode on the second insulation substrate, and projections on the counter electrode, elongated in a second direction intersecting the first direction, and a liquid crystal layer held between the first and second substrates. The projections extend through pixel regions defined by the pixel electrodes and counter electrode, and are formed asymmetrical with respect to a first imaginary line passing through centers of opposite short sides of each pixel electrode and extending in the first direction, and with respect to a second imaginary line passing through centers of opposite long sides of each pixel electrode and extending in the second direction.

4 Claims, 10 Drawing Sheets

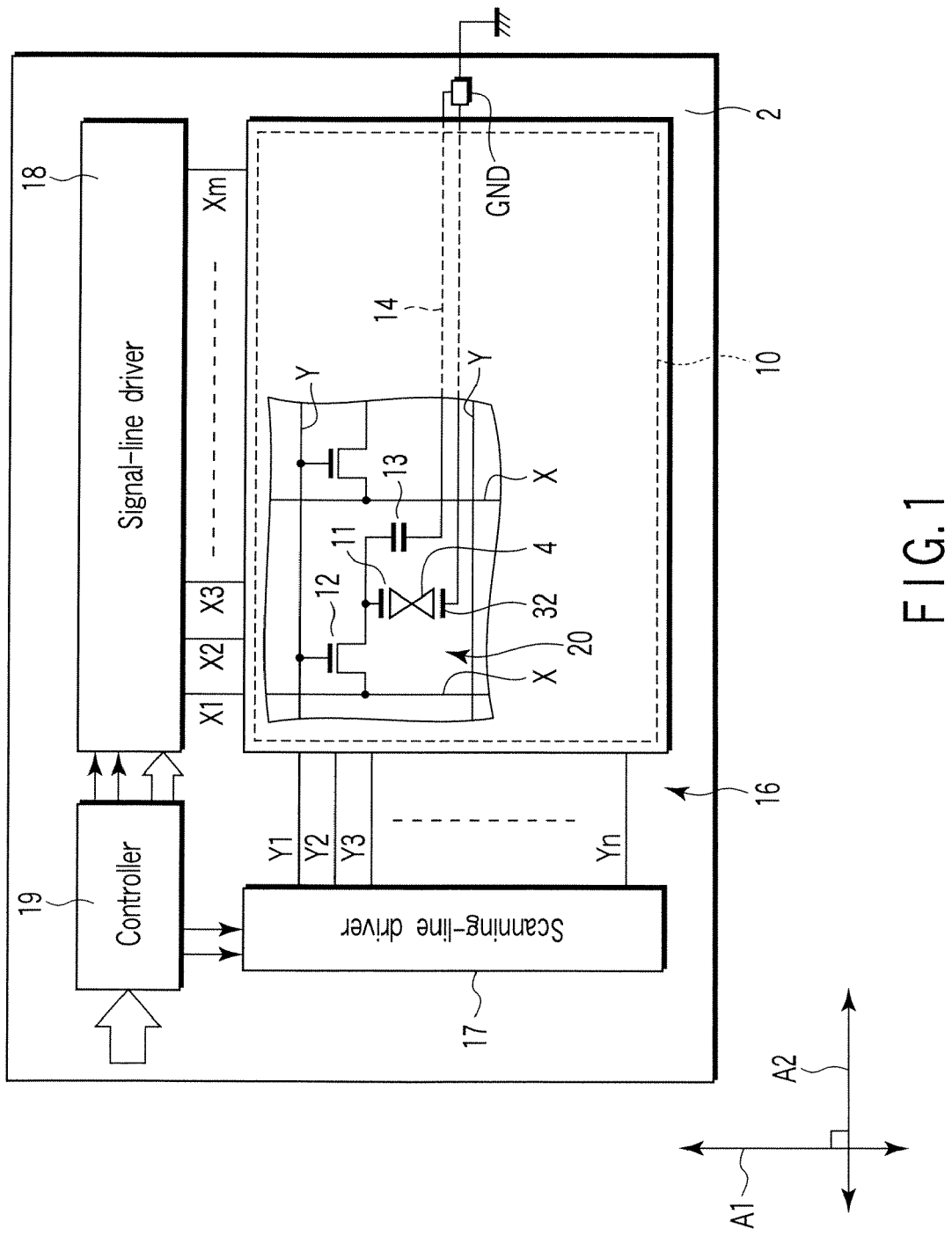
F I G. 1

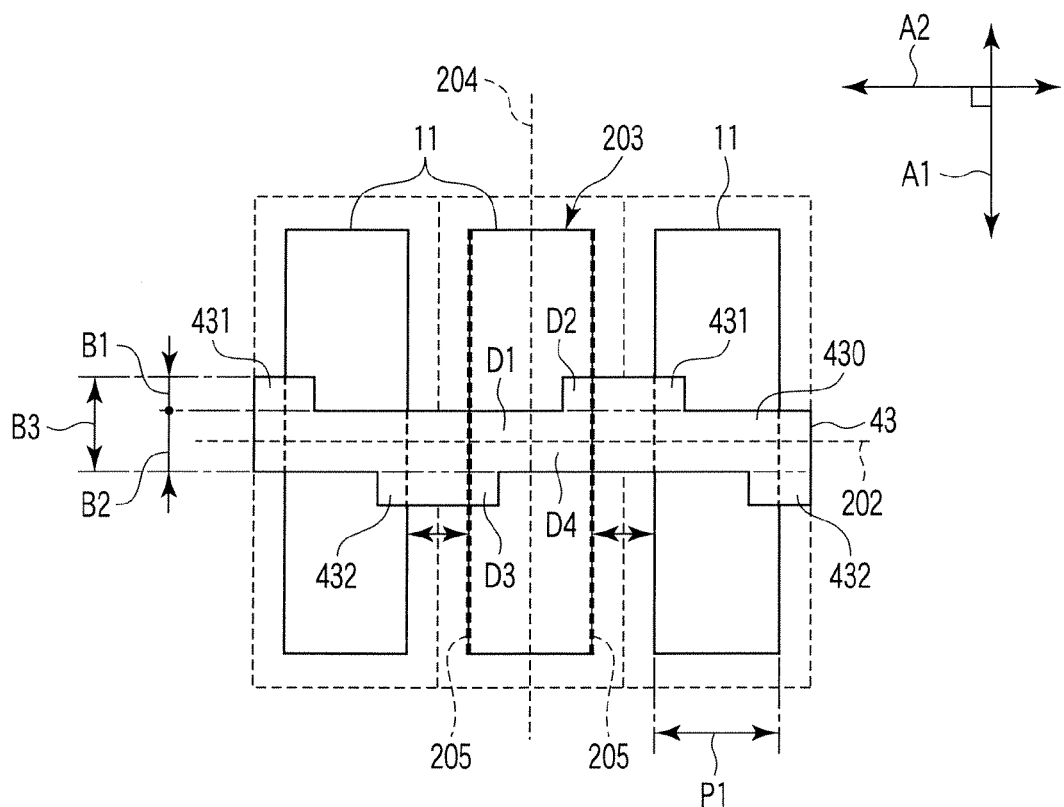
F I G. 3
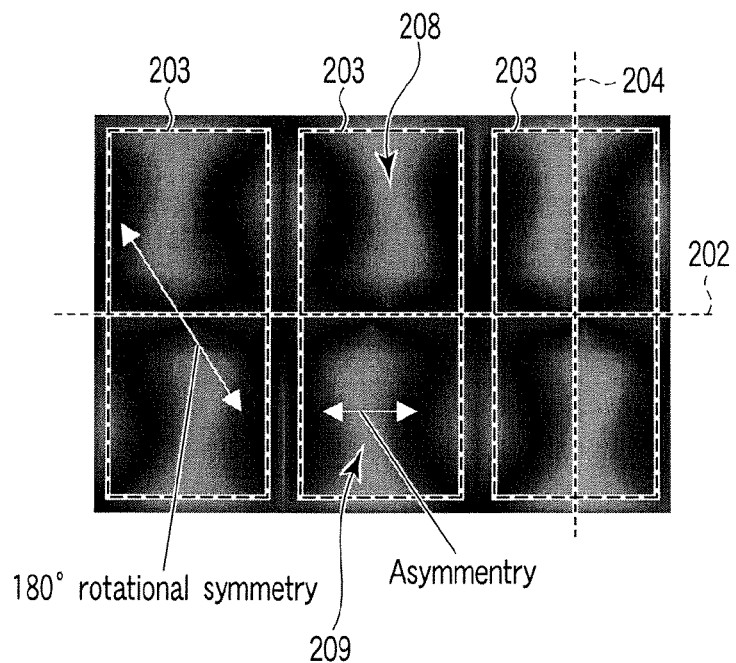
F I G. 4

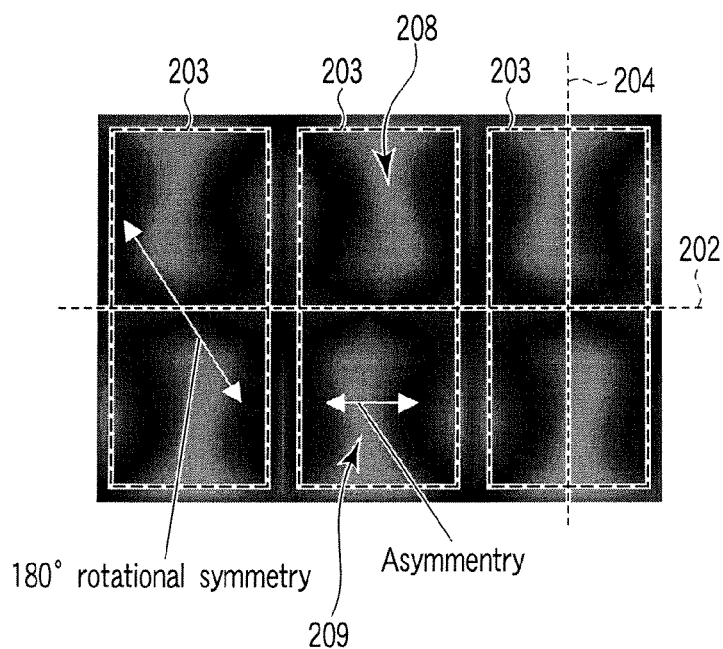
F I G. 7
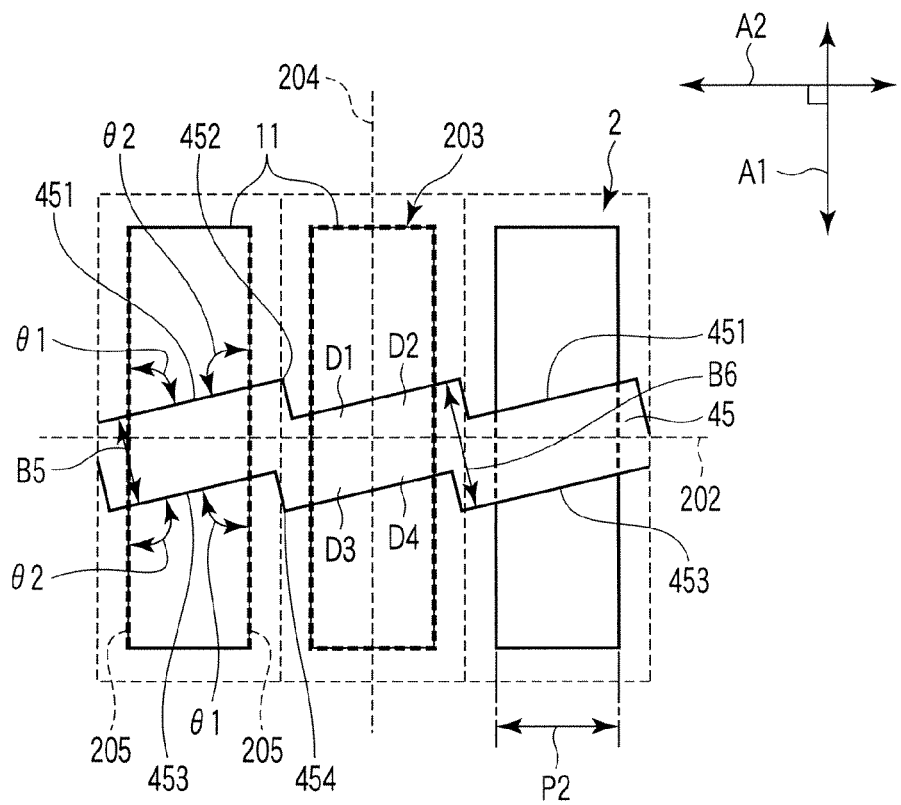
F I G. 8

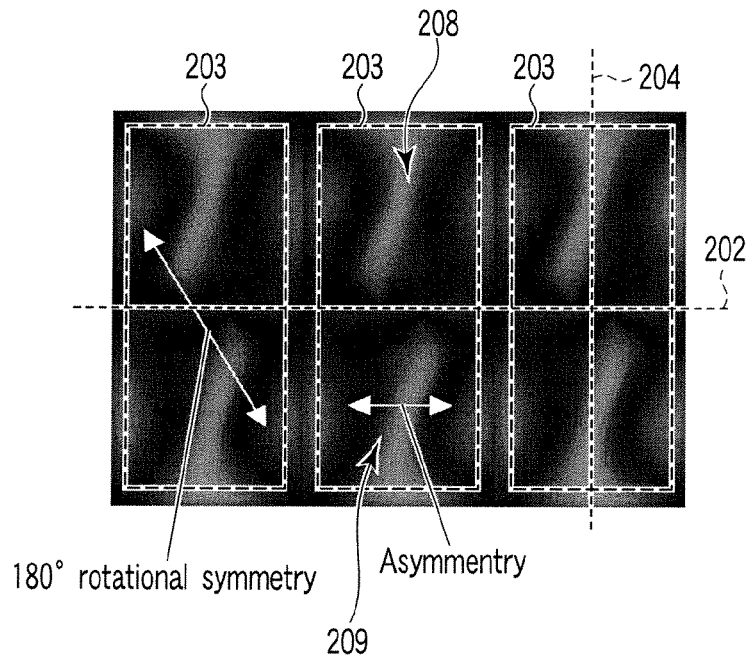
F I G. 9
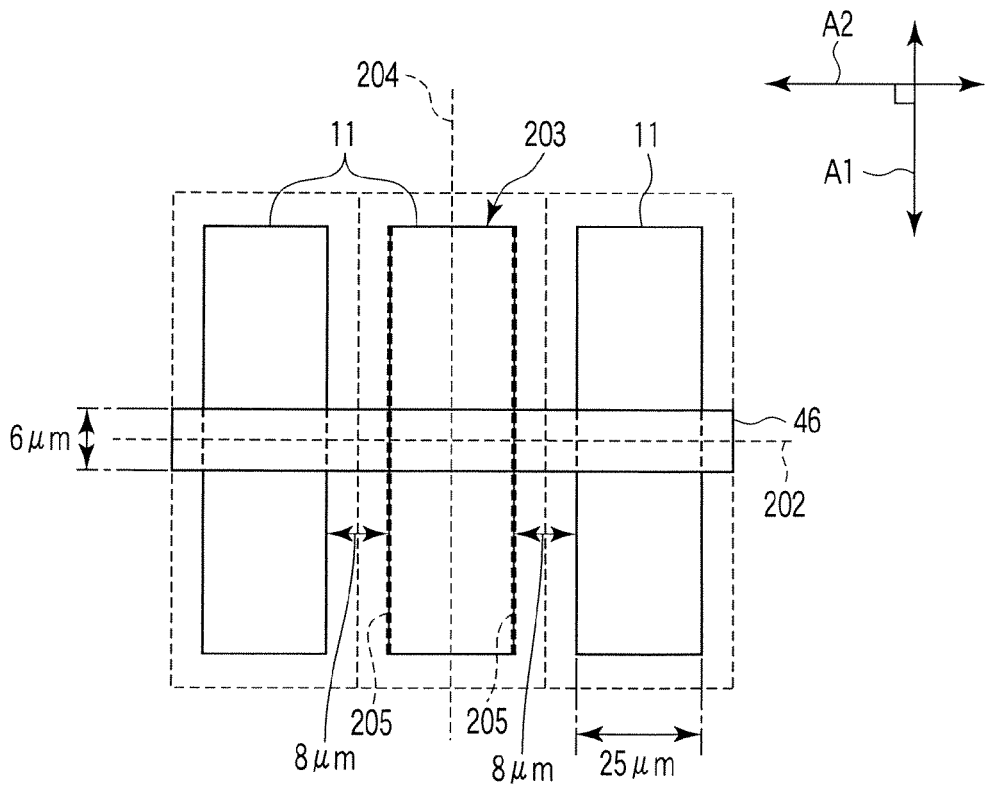
F I G. 10

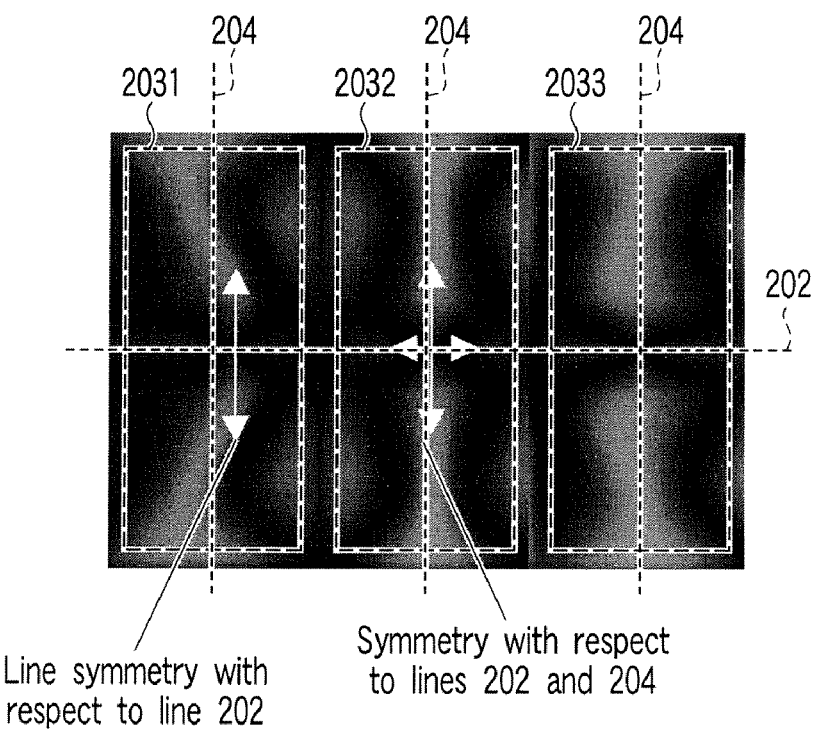
Line symmetry with respect to line 202
Symmetry with respect to lines 202 and 204
F I G. 11
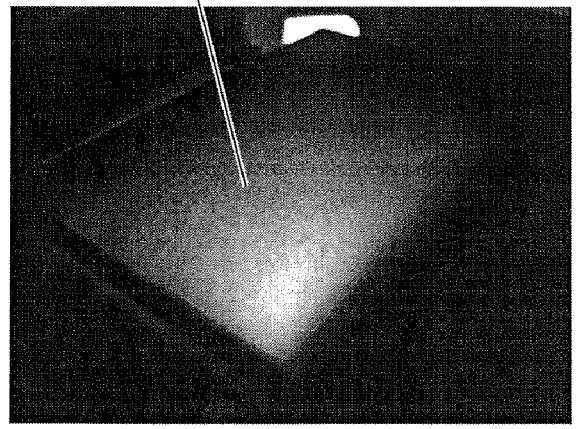
Non-smooth (uneven display)
F I G. 12

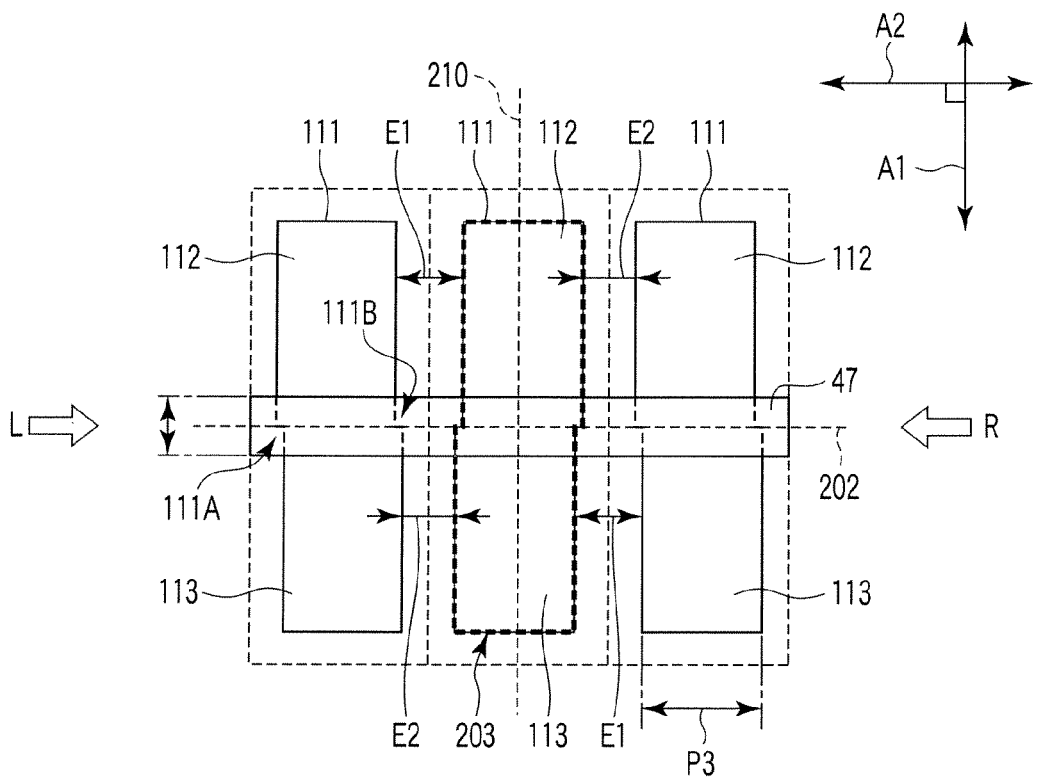
F I G. 13
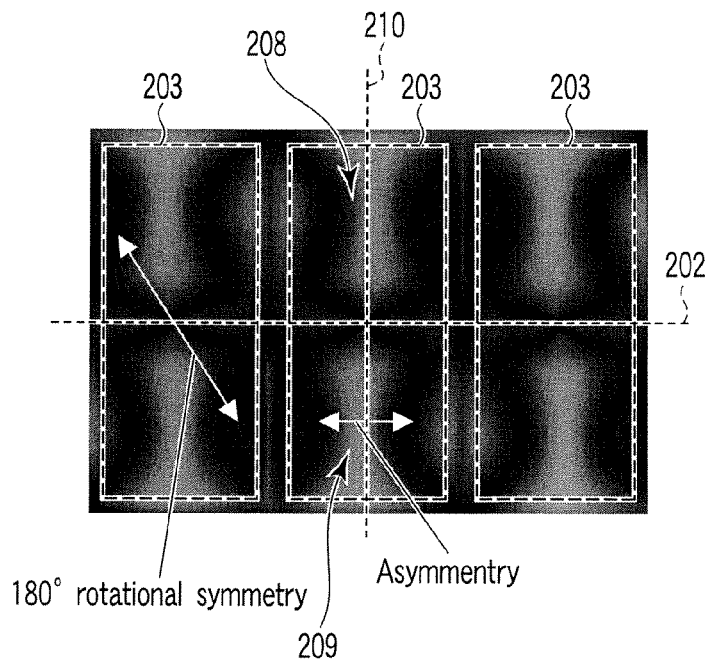
F I G. 14

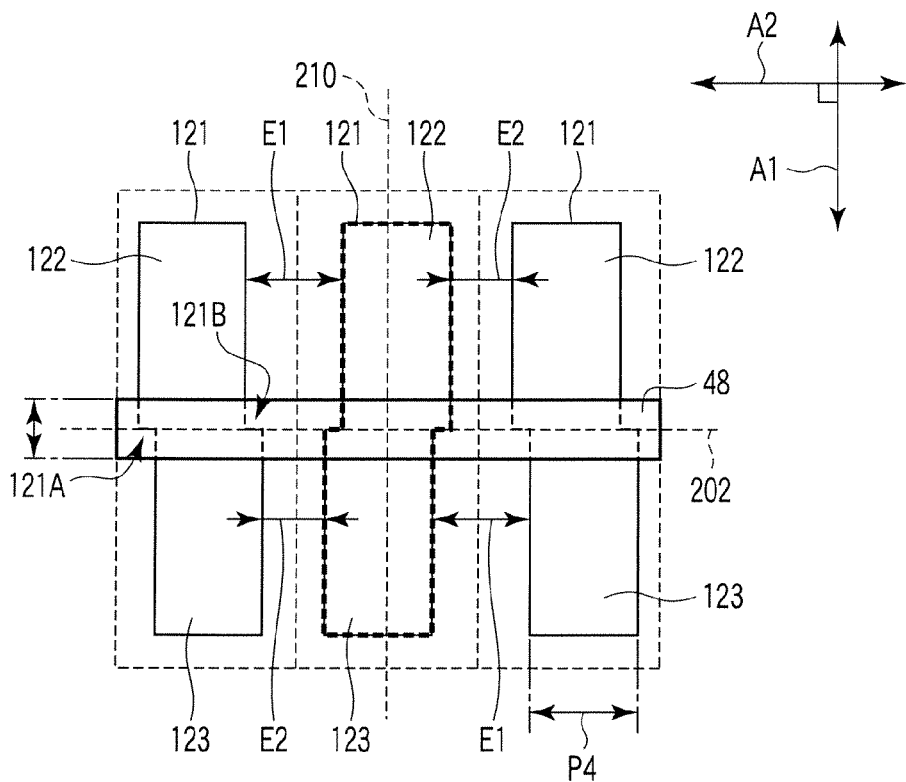
F I G. 15
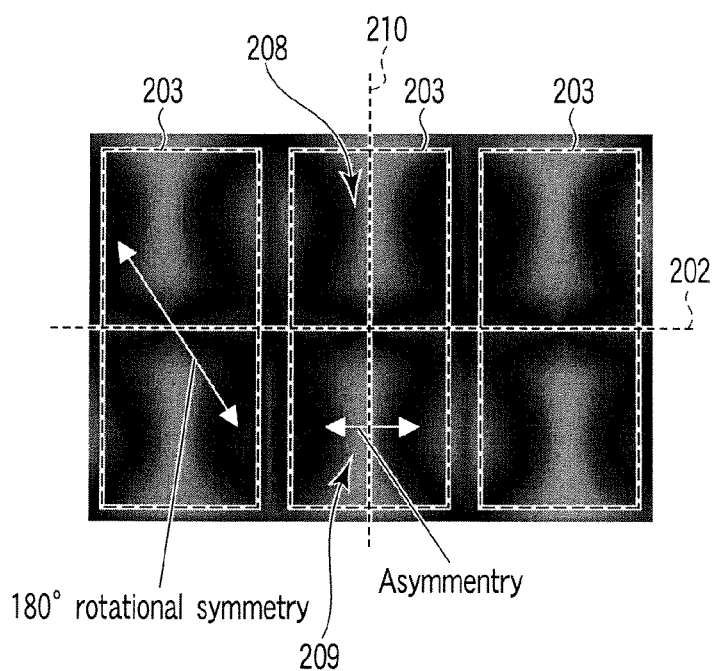
F I G. 16

LIQUID CRYSTAL DISPLAY DEVICE

CROSS-REFERENCE TO RELATED APPLICATIONS

This application is based upon and claims the benefit of priority from prior Japanese Patent Application No. 2006-008912, filed Jan. 17, 2006, the entire contents of which are incorporated herein by reference.

BACKGROUND OF THE INVENTION

1. Field of the Invention

The present invention relates to a liquid crystal display device, and more particularly to a liquid crystal display device that includes a liquid crystal layer divided into a plurality of domains in which the alignments (i.e., tilt angles) of liquid crystal molecules are controlled.

2. Description of the Related Art

Liquid crystal display devices are light, thin and of low power consumption, and hence are used in various machines, such as OA devices, information terminals, clocks and TV sets. In particular, active matrix type liquid crystal display devices provide excellent responsiveness by switching pixels using thin-film transistors (TFTs), therefore can be used as the display monitors of cellular phones, TV sets and computers that are required to display a large number of image information items.

In recent years, in accordance with an increase in the amount of information, there is a demand for increases in the degree of definition and display speed. Definition can be enhanced by miniaturizing a TFT array structure to increase the number of pixels employed therein. Further, concerning enhancement of display speed, to shift the alignment of liquid crystal molecules in a shorter time, a liquid crystal display mode is required in which a molecule response speed twice to several tens of times the present response speed can be acquired. As the liquid crystal display mode, the OCB type, VAN type, HAN type, π-alignment type, which utilize nematic liquid crystal, surface stabilized ferroelectric liquid crystal type utilizing smetic liquid crystal, or anti-ferroelectric liquid crystal type can be used.

In particular, attention has now been paid to the VAN-type alignment mode, since it exhibits a higher response speed than the conventional twist nematic (TN) type alignment mode, and does not require the conventional rubbing alignment process that may well cause defectiveness such as electrostatic breakdown. Further, the VAN-type alignment mode is also advantageous in designs for viewing angle compensation can be easily achieved. A wide viewing angle can be acquired by employing a multi-domain format, in which each pixel is divided into a plurality of domains between which the alignment of liquid crystal molecules differs.

Jpn. Pat. Appln. KOKAI Publication No. 6-43461, for instance, discloses a liquid crystal display device having a structure (a cutout portion), which serves as means for controlling the alignments of liquid crystal molecules, and in which a part or periphery of an electrode is electrically disconnected. In this liquid crystal display device, a change in electric field applied between the substrates is caused by a cutout portion or near this portion, which uniquely determines the tilt corresponding to the dielectric anisotropy of the material of the liquid crystal molecules.

However, if each pixel is divided into a plurality of domains by dielectric layers on the electrodes, or by slits formed in the electrodes, the light transmissivity of the dielectric layer or the portion with the slit may well be reduced because of light loss.

Further, in recent years, there is a demand for a super definition liquid crystal display in which the width of each pixel electrode is about 40 μm or less. If in such a super definition liquid crystal display, the conventional dielectric layers or slits are utilized, the light transmissivity will be significantly reduced.

BRIEF SUMMARY OF THE INVENTION

The present invention has been developed to solve the above problems, and objects to provide a liquid crystal display device having a high transmissivity and wide viewing angle.

In accordance with an aspect of the invention, there is provided a liquid crystal display device comprising:

a first substrate including a first insulation substrate, and a plurality of rectangular pixel electrodes provided in a matrix on the first insulation substrate and elongated in a first direction;

a second substrate opposing the first substrate, and including a second insulation substrate, a counter electrode provided on the second insulation substrate and corresponding to the pixel electrodes, and a plurality of projections provided on the counter electrode and elongated in a second direction intersecting the first direction; and a liquid crystal layer held between the first and second substrates, the projections extending through a plurality of pixel regions defined by the pixel electrodes and the counter electrode, the projections being formed asymmetrical with respect to a first imaginary line passing through centers of opposite short sides of each of the pixel electrodes and extending in the first direction, and with respect to a second imaginary line passing through centers of opposite long sides of each of the pixel electrodes and extending in the second direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating the configuration of a liquid crystal display device according to a first embodiment of the invention;

FIG. 3 is a schematic view of a liquid crystal display panel for use in the liquid crystal display device of FIGS. 1 and 2, taken from the counter substrate side;

FIG. 4 is a view illustrating an alignment state of the liquid crystal display panel of FIG. 3 in a display mode;

FIG. 7 is a view illustrating an alignment state of the liquid crystal display panel of FIG. 6 in the display mode;

FIG. 8 is a schematic view of a liquid crystal display panel different from the panel of FIG. 3, taken from the counter substrate side;

FIG. 9 is a view illustrating an alignment state of the liquid crystal display panel of FIG. 8 in the display mode;

FIG. 10 is a schematic view of a liquid crystal display panel as a comparative example for the panels of FIGS. 3, 6 and 8, taken from the counter substrate side;

FIG. 11 is a view illustrating an alignment state of the liquid crystal display panel of FIG. 10 in the display mode;

FIG. 12 is a view illustrating a white-display state of the liquid crystal display panel of FIGS. 10 and 11 in the display mode;

FIG. 13 is a schematic view of a liquid crystal display panel according to a second embodiment of the invention, taken from the counter substrate side;

FIG. 14 is a view illustrating an alignment state of the liquid crystal display panel of FIG. 13 in the display mode;

FIG. 15 is a schematic view of a liquid crystal display panel similar to the panel of FIG. 13, taken from the counter substrate side;

FIG. 16 is a view illustrating an alignment state of the liquid crystal display panel of FIG. 15 in the display mode;

DETAILED DESCRIPTION OF THE INVENTION

Liquid crystal display devices according to embodiments of the invention will be described with reference to the accompanying drawings.

FIRST EMBODIMENT

Figure 2:
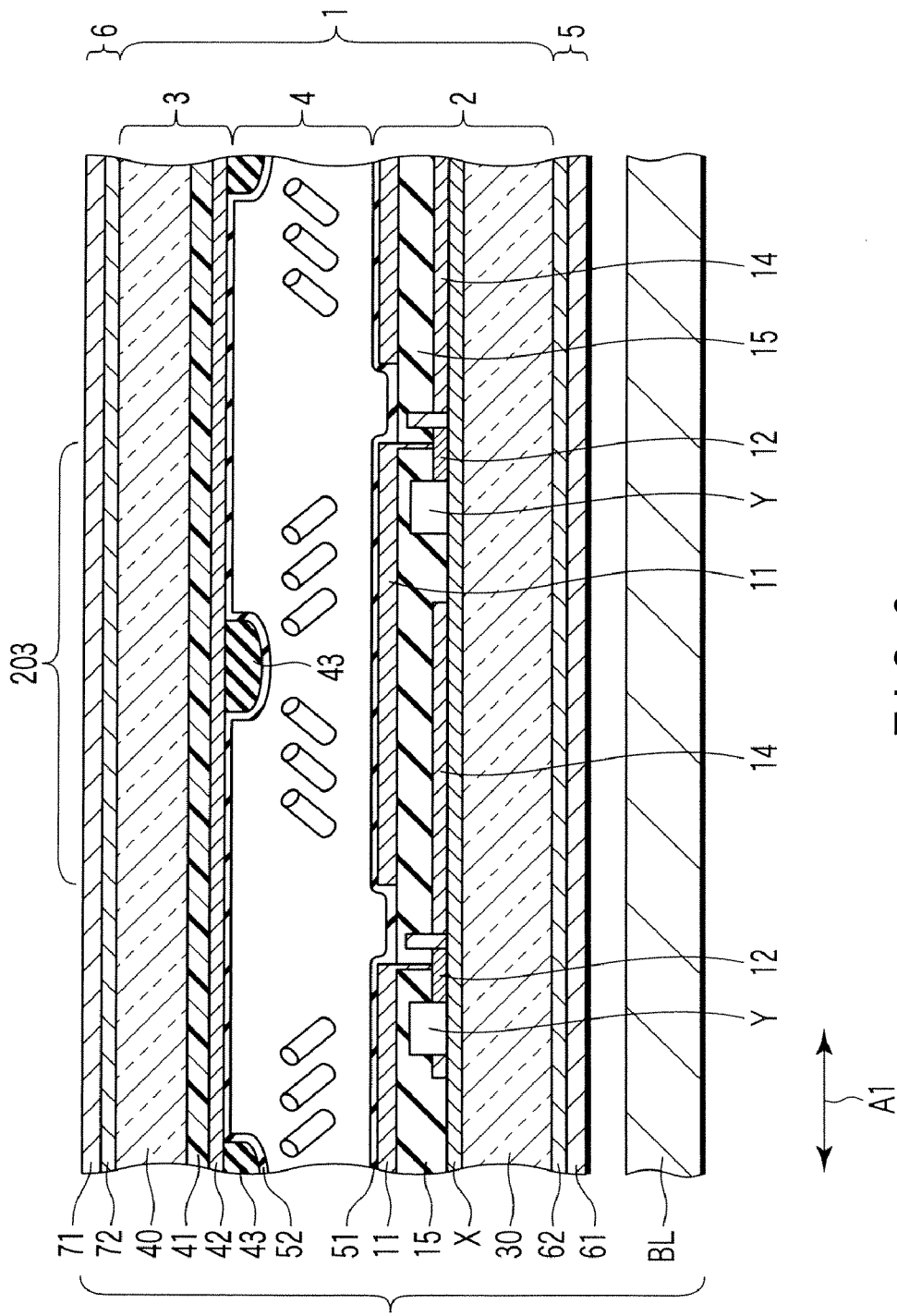
FIG. 2 is a sectional view illustrating the fundamental structure of the liquid crystal display device of FIG. 1.

FIG. 1 schematically shows the configuration of a liquid crystal display device according to a first embodiment of the invention. FIG. 2 is a sectional view illustrating the fundamental structure of the liquid crystal display device of FIG. 1. FIG. 3 is a schematic view of the liquid crystal display device of FIGS. 1 and 2, taken from the counter substrate side.

As shown in FIG. 2, the liquid crystal display device is an active-matrix type color liquid crystal display device, and comprises a liquid crystal panel 1. The liquid crystal panel 1 comprises an array substrate (first substrate) 2, a counter substrate (second substrate) 3 arranged opposite to the array substrate, and a liquid crystal layer 4 interposed between the array substrate 2 and counter substrate 3.

The liquid crystal display device further comprises a first polarization control element 5 provided on the outer surface of the array substrate 2 opposite to the surface thereof that holds the liquid crystal layer 4, and a second polarization control element 6 provided on the outer surface of the counter substrate 3 opposite to the surface thereof that holds the liquid crystal layer 4. The liquid crystal display device also comprises a backlight unit BL for illuminating the liquid crystal panel 1 from the first polarization control element 5 side.

The first and second polarization control elements 5 and 6 control the polarized state of light passing therethrough, thereby forming elliptically polarized beam spots incident on the liquid crystal layer 4. Specifically, the first polarization control element 5 converts, into elliptically polarized light, the backlight passing therethrough, i.e., the backlight immediately before the liquid crystal layer 4. Similarly, the second polarization control element 6 converts, into linearly polarized light, the backlight having passed through the liquid crystal layer 4.

The liquid crystal display panel constructed above includes a plurality of pixels 20 arranged in a matrix of m×n in a display region 10 for displaying images, as is shown in FIG. 1.

The array substrate 2 is a light-transmissive insulation substrate (first insulation substrate) 30 formed of, for example, a glass plate or quarts plate. Specifically, the array substrate 2 comprises, in the display region 10, m×n pixel electrodes 11, n scanning lines Y (Y1 to Yn), m signal line X (X1 to Xm), m×n switching elements, i.e., m×n thin-film transistors (TFT) 12, a plurality of auxiliary capacitors 13, and a plurality of auxiliary capacitor lines 14.

The pixels 20 have the respective pixel electrodes 11. The scanning lines Y are provided in the direction parallel to the rows of the pixel electrodes 11. The signal lines X are provided in the direction parallel to the columns of the pixel electrodes 11. The pixels 20 have the respective TFTs 12 located near the intersections of the scanning lines Y and signal lines X. The auxiliary capacitors 13 are provided parallel to the respective liquid crystal capacitors. Each auxiliary capacitor line 14 is capacitively coupled to the pixel electrodes 11 of the corresponding row to thereby provide the corresponding auxiliary capacitors 13, and extend substantially parallel to the corresponding scanning line Y.

An insulation layer 15 is provided between the pixel electrodes 11 and auxiliary capacitor lines. The direction parallel to the signal lines X will hereinafter be referred to as a first direction A1, and the direction perpendicular to the signal lines X and parallel to the scanning lines Y will hereinafter be referred to as a second direction A2.

Further, as shown in FIG. 1, the array substrate 2 includes, in a driving circuit region 16 around the display region 10, a scanning-line driver 17 connected to the n scanning lines Y, and a signal-line driver 18 connected to the m signal lines X. The scanning-line driver 17 and signal-line driver 18 are connected to a controller 19 for controlling the entire liquid crystal display device.

The scanning-line driver 17 sequentially supplies scanning signals (driving signal) to the n scanning lines Y under the control of the controller 19. The signal-line driver 18 supplies video signals (driving signal) to the m signal lines X under the control of the controller 19 whenever the TFTs 12 of each row are turned on by the scanning signal. As a result, the pixel electrodes 11 of each row are set at a pixel potential corresponding to the video signal supplied via the corresponding TFTs 12.

As shown in FIGS. 2 and 3, the pixel electrodes 11 are formed of a light-transmissive conductive film formed of, for example, indium tin oxide (ITO), and provided on the insulation film 15. Each pixel electrode 11 is substantially rectangular. Specifically, each pixel electrode 11 is in the shape of a rectangle with longer sides extending in the first direction A1, and shorter sides of 40 μm or less (that extend in the second direction A2 and will hereinafter be referred to as a "width"). In the embodiment, the width P1 of the pixel electrodes is 25 μm.

The pixel electrodes 11 are electrically connected to the TFTs 12. When the TFTs 12 are supplied with a scanning signal from the scanning-line driver 17, they are turned on and supply the pixel electrodes 11 with video signals sent from the signal-line driver 18.

The counter substrate 3 comprises a light-transmissive insulation substrate (second insulation substrate) 40 formed of a glass or quartz plate, a color filter 41 provided on the substrate 40, a counter electrode 42 and a plurality of projections 43.

Alignment films 51 and 52 are formed on the respective surfaces of the array substrate 2 and counter substrate 3 that directly contact the liquid crystal layer 4. The alignment films 51 and 52 cause liquid crystal molecules to be aligned perpendicular to the array substrate 2 and counter substrate 3. As a result, the liquid crystal molecules have their major axes aligned perpendicular to the boundaries of the substrates. In the first embodiment, the alignment films 51 and 52 are, for example, polyimide alignment films with a thickness of 50 to 90 nm.

In the display region 10 of the light-transmissive insulation substrate 40, the color filter 41 includes a black matrix (not shown) that partitions the pixels 20, and color layers (not shown) provided on the respective pixels 20 surrounded by the black matrix. The black matrix is opposed to wiring sections such as the scanning lines Y and signal lines X on the array substrate 2. The color layers are formed of colored resin materials of different colors, for example, three elementary colors such as red, blue and green. The red, blue and green resin materials are arranged in accordance with red, blue and green pixels.

The counter electrode 42 is opposed to the pixel electrodes 11 of all pixels 20. The counter electrode 42 is formed of a light-transmissive conductive film made of, for example, indium tin oxide (ITO), and electrically connected to the auxiliary capacitors 13.

The projections 43 are provided on the counter electrode 42 parallel to each other in the second direction A2 perpendicular to the long side of each pixel electrode 11 (first direction A1). As shown in FIG. 3, each projection 43 extends along the longitudinally central portions of the corresponding pixel electrodes 11, overlapping the corresponding pixel electrodes 11 with the liquid crystal layer 4 interposed therebetween. Namely, a first imaginary line 202 passing through the center of each projection 43 in the second direction 2A passes through the central points of the opposing long sides of the corresponding pixel electrodes, thereby dividing each of the corresponding pixel electrodes into two same portions.

Each projection 43 includes a rectangular stripe portion 430 extending in the second direction 2A, and a plurality of convex portions 431 and 432 formed integral with the stripe portion 430. The convex portions 431 and 432 project by a preset length B1 from the opposite sides of the stripe portion 430 in the first direction A1. The convex portions 431 and 432 are provided alternately in the second direction A2. Namely, in the first direction A1, each projection 43 has a first width B2, and a second width B3 greater than the first width B2 by the length B1 the convex portions 431 and 432. Thus, each projection 43 has the convex portion (first convex portion) 431 projecting from one side, and the convex portion (second convex portion) 432 projecting from the other side, the projections 431 and 432 being arranged alternately in the second direction A2.

As described above, each projection 43 is formed asymmetrical with respect to the first imaginary line 202 in a pixel region 203 defined between the pixel electrodes 11 and counter electrode 42. Each projection 43 is also formed asymmetrical in the pixel region 203 with respect to a second imaginary line 204 that passes through the central points of the opposing short sides of the corresponding pixel electrodes 11. Further, each projection 43 in the pixel region 203 is formed rotationally symmetrical about the intersection of the first and second imaginary lines 202 and 204. In other words, each projection 43 in the pixel region 203 is formed point-symmetrical about the intersection of the first and second imaginary lines 202 and 204. That is, the shape of each projection 43 in the pixel region 203 is identical to its initial one when it is rotated through 180°.

Further, the projection 43 in the pixel region 203 comprises four divisions D1, D2, D3 and D4 into which the projection is divided by the first and second imaginary lines 202 and 204. The diagonally positioned divisions D2 and D3 have a larger area than the other diagonally positioned divisions D1 and D4. Namely, the divisions D2 and D3 are larger than the divisions D1 and D4 since the formers include part of the convex portions 431 and 432.

Furthermore, in the schematic view of FIG. 3 taken from the counter substrate side, in the divisions D1 and D3 of the projection 43, the third imaginary line 205 corresponding to one side of each pixel electrode 11 intersects the edges of the projection 43 at right angles. Further, in the divisions D2 and D4 of the projection 43, the third imaginary line 205 corresponding to the other side of each pixel electrode 11 intersects the edges of the projection 43 at right angles.

The array substrate 2 and counter substrate 3 constructed as above are opposed to each other with a preset gap of, for example, 3.5 μm±0.3 μm, by columnar spacers (not shown) provided in the effective display region 10. The peripheries of the array substrate 2 and counter substrate 3 are bonded to each other by, for example, a sealing member, thereby forming a liquid crystal material injecting cell. The liquid crystal layer 4 is formed by sealing, in the cell, a liquid crystal material (nematic liquid crystal material with negative dielectric anisotropy) having negative dielectric anisotropy. Namely, the liquid crystal layer 4 is held between the alignment film 51 on the array substrate 2 and the alignment film 52 on the counter substrate 3. As a result, a vertical alignment mode can be realized in which the liquid crystal molecules contained in the liquid crystal layer 4 are vertically aligned by the alignment control of the alignment films 51 and 52.

In the liquid crystal display device constructed as above, when a voltage is applied between the pixel electrodes 11 and counter electrode 42 to establish a display mode, changes in electrical field occur near the projections 43, which induce changes in the liquid crystal alignment of the liquid crystal layer 4 using the projections 43 as boundaries, as is shown in FIG. 2. As a result, two domains are formed on each pixel electrode 11. When a plurality of domains are thus formed on each pixel region 203, anisotropy occurs in the liquid crystal molecules of the liquid crystal layer 4, resulting in realization of a wide viewing angle.

FIG. 4 shows an alignment state of the liquid crystal display panel 1 in the display mode. As shown in FIG. 4, the image region 203 includes a first division region 208 and second division region 209 into which the region 203 is divided by the first imaginary line 202 (i.e., the projection 43). The liquid crystal alignment patterns of the first division region 208 and the second division region 209 are not mirror patterns with respect to the first imaginary line 202. Further, the liquid crystal alignment pattern of the first division 208 is asymmetrical with respect to the second imaginary line 204, and that of the second division 209 is also asymmetrical with respect to the second imaginary line 204. Furthermore, the liquid crystal alignment pattern of the pixel region 203 is rotationally symmetrical with respect to the intersection of the first and second imaginary lines 202 and 204.

In addition, each pair of adjacent ones of a plurality of pixel regions 203 in the second direction A2 exhibits mirror-image liquid crystal alignment. Namely, each pair of adjacent pixel regions 203 in the second direction A2 exhibits line symmetry in liquid crystal alignment with respect to their boundary.

Figure 5:
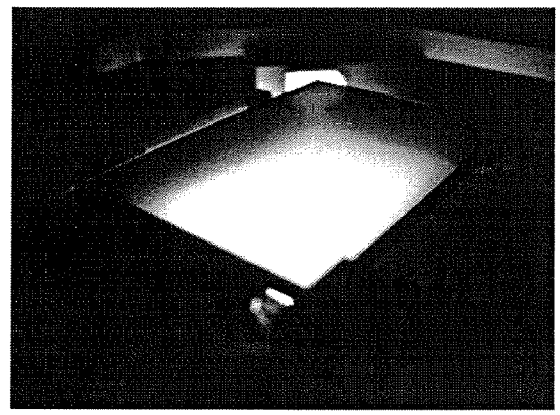
FIG. 5 is a view illustrating a white-display state of the liquid crystal display panel of FIGS. 3 and 4 in the display mode.

Thus, in the liquid crystal panel 1, liquid crystal alignment of a certain rule is realized, in which, for example, each pair of adjacent pixel regions 203 exhibits line symmetry in liquid crystal alignment. This enables a smooth and uniform white display as shown in FIG. 5 to be achieved in the white display mode in the liquid crystal panel 1.

In the multi-domain system employed in the first embodiment, it is known that when a domain boundary for widening the viewing angle is formed, it may well cause abrupt change in light transmissivity and a reduction in brightness in a normally black mode. Concerning the relationship between a tilt control structure providing the domain boundary and the light transmissivity, the inventors of the present invention have found that a reduction in brightness due to the ratio in area of a tilt control structure to each pixel is greater than that due to the shape or alignment of a tilt control structure. The ratio in area of the projection 43 to the pixel region 203, which is provided in the invention parallel to the short sides of each pixel electrode 11, is smaller than that of a projection to the pixel region 203, which is provided parallel to the long sides of each pixel electrode 11. Therefore, in the invention, the light transmissivity can be enhanced, and domain division can be performed easily. This enables a high light transmissivity and hence high brightness to be secured.

As described above, the convex portions 431 and 432, which do not make, as mirror patterns, the liquid crystal alignment patterns of the first and second divisions 208 and 209 in the pixel region 203, are provided at the opposite sides of the projection 43. As a result, the alignment states of the entire pixel regions 203 can be stabilized, and liquid crystal alignments having a preset regulation can be realized. This can realize a liquid crystal display device of a multi-domain scheme, which provides stabilized alignment states and a wide viewing angle. Further, the convex portions 431 and 432 can be formed integral with the projection 43 by a known method of exposing a photosensitive resin (e.g., a photosensitive acrylic resin) using a preset mask for forming the projection 43 with convex portions, and developing the resultant structure. Namely, a liquid crystal display device of a multi-domain scheme that provides stabilized alignment states and a wide viewing angle can be realized without changing a conventional forming process. Further, adverse influences upon the manufacturing cost and efficiency can be minimized, resulting in enhancement of productivity.

In the first embodiment, it is sufficient if the projection 43 provided in the regions other than the edge of each pixel electrode 11 has a tilt angle and height sufficient to have an alignment changing capacity. For instance, if the cell gap between the array substrate 2 and counter substrate 3 is 3.5 µm, and the length P1 of the short side of the pixel electrode 11 is 25 µm, it is preferable that the height of the projection 43 is 1.5 µm, the length B1 of the convex portions 431 and 432 is 5 µm, the first width B2 is 6 µm, and the interval between each pair of adjacent pixel electrodes 11 is 8 µm. Namely, in the first embodiment, the length B1 of the convex portions 431 and 432 of the projection 43 in the first direction A1 is shorter than the first width B2.

Further, as shown in FIG. 2, in the first embodiment, the first polarization control element 5 includes a first polarizer 61 and first retardation film 62, and the second polarization control element 6 includes a second polarizer 71 and second retardation film 72. The first and second retardation films 62 and 72 are, for example, so-called quarter-wave plates for imparting a phase difference of a quarter wavelength to light of a preset wavelength to thereby divide the light into normal light and abnormal light. Further, the first and second polarizers 61 and 71 have an absorption axis and transmission axis, respectively, which intersect each other in the plane perpendicular to the optical path. These polarization plates are used to extract, from light having a vibration plane in a random direction, light having a vibration plane in a direction parallel to the transmission axis, i.e., linearly polarized light.

First Modification of the First Embodiment

Figure 6:
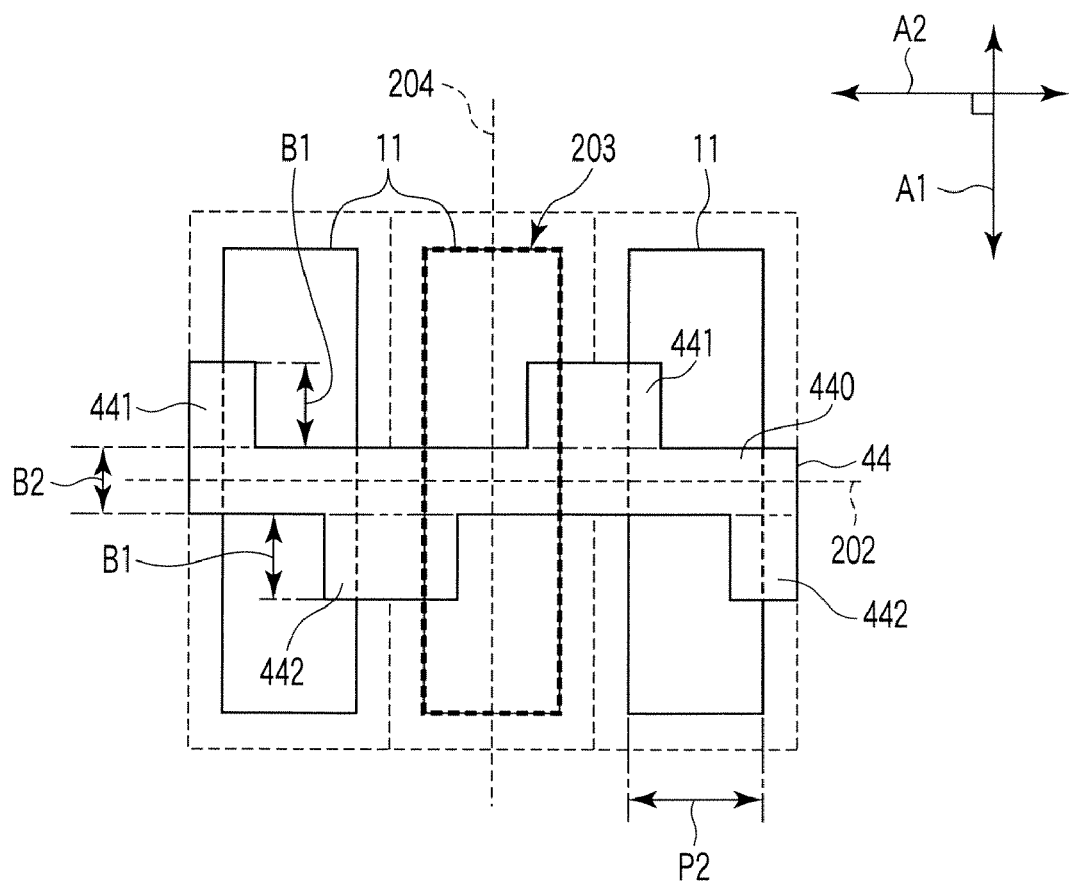
FIG. 6 is a schematic view of a liquid crystal display panel different from the panel of FIG. 3, as seen from the counter substrate side.

Referring then to FIGS. 6 and 7, a first modification of the first embodiment will be described. As shown in FIG. 6, a projection 44 comprises a rectangular stripe portion 440 extending in the second direction 2A, and a plurality of convex portions 441 and 442, like the projection 43. The stripe portion 440 and the convex portions 441 and 442 are formed integral. The convex portions 441 project from one side of the stripe portion 440, and the convex portions 441 project from the other side of the stripe portion 440. The convex portions 441 and 442 are provided alternately in the second direction A2. Namely, like the projection 43, the projection 44 is formed asymmetrical with respect to the first and second imaginary lines 202 and 204 in the pixel region 203 defined between the pixel electrodes 11 and counter electrode 42. Further, the projection 44 in the pixel region 203 is formed rotationally symmetrical about the intersection of the first and second imaginary lines 202 and 204.

The projection 44 of the first modification differs from the projection 43 in that the width P2 of the pixel electrode 11 is 40 µm, which is greater than the width P1 of the pixel electrode 11 in the first embodiment. The height of the projection 44 is 1.5 µm, the length B1 of the convex portions 441 and 442 in the first direction A1 is 10 µm, the first width B2 is 6 µm, and the interval between each pair of adjacent pixel electrodes 11 is 8 µm. Thus, in the first modification, the length B1 of the convex portions 441 and 442 in the first direction A1 is longer than the first width B2.

Since the asymmetry in liquid crystal alignment in the pixel region 203 can be emphasized by elongating the length B1 of the convex portions 441 and 442, the alignment state of the pixel region 203 can be stabilized. Accordingly, even when the width P2 is greater than the width P1, alignment stability can be realized by increasing the length B1 of the convex portions 441 and 442 of the projection 44.

Accordingly, as shown in FIG. 7, the alignment state of the liquid crystal panel 1 in the display mode has a preset regulation, i.e., the liquid crystal alignment patterns of adjacent pixel regions 203 are mirror patterns with respect to their respective boundaries. More specifically, as described above with reference to FIG. 4, each pixel region 203 is divided by the first imaginary line 202 (i.e., by the projection 44) into a first division 208 and second division 209 having mirror liquid crystal alignment patterns that are not mirror patterns with respect to the first imaginary line 202. Further, in each of the first and second divisions 208 and 209, the liquid crystal alignment patterns of the first and second divisions 208 and 209 are not mirror patterns with respect to the second imaginary line 204. Furthermore, the liquid crystal alignment pattern of the pixel region 203 is rotationally symmetrical about the intersection of the first and second imaginary lines 202 and 204. This enables a smooth and uniform white display as shown in FIG. 5 to be achieved in the liquid crystal panel 1 in the white display mode.

Second Modification of the First Embodiment

Referring then to FIGS. 8 and 9, a second modification of the first embodiment will be described. As shown in FIG. 8, a projection 45 has opposite edges of a saw-tooth shape. More specifically, the projection 45 comprises a plurality of rectangular portions defined by straight lines 451 and 453, and a plurality of corner portions 452 and 454 denoted by reference numbers. The rectangular portions and corner portions are alternately coupled. The corner portions are located between each pair of adjacent ones of the pixel electrodes 11. Each rectangular portion obliquely intersects the corresponding pixel electrode 11. Namely, the straight line 451 of each rectangular portion intersects one side (edge) of the pixel electrode 11 at a first angle θ1, and intersects the other side of the pixel electrode 11 at a second angle θ2. Similarly, the straight line 453 of each rectangular portion intersects the one side (edge) of the pixel electrode 11 at the second angle θ2, and intersects the other side of the pixel electrode 11 at the first angle θ1.

The first angle θ1 is less than 90°. The sum of the first and second angles θ1 and θ2 is 180°. In the second modification, it is preferable that the first angle θ1 falls within a range of not less than 80° and less than 90°, and the first angle θ1 falls within a range of more than 90° and not more than 100°.

Further, in the region included in each pixel region 203 and opposing the corresponding pixel electrode 11, the projection 45 has a third width B5. In the region opposing the interval between each pair of adjacent pixel electrodes 11, the projection 45 has a fourth width B6. In other words, the projection 45 has the third and fourth widths B5 and B6 in its transversal direction. The projection 45 has a plurality of rectangular portions defined by the straight lines 451 and 453, and the first angle θ1 formed between the projection 45 and a third imaginary line 205 coinciding with the long side of each pixel electrode 11 is set to less than 90°. The projection 45 has a shape obtained by coupling the rectangular portions. A plurality of projections similar to the above-described projection 45 and extending in the second direction A2 are arranged at regular intervals in the first direction A1, like the projections 43 so that they divide each of the pixel electrodes 11 into two equal portions in the first direction A1.

Accordingly, each projection 45 is formed asymmetrical with respect to both the first and second imaginary lines 202 and 204. Further, each projection 45 is formed rotationally asymmetrical with respect to the intersection of the first and second imaginary lines 202 and 204. Further, all the pixel regions 203 have the same liquid crystal alignment.

As a result, a symmetrical liquid crystal alignment is acquired in each pixel region 203, and the same liquid crystal alignment is acquired in all pixel regions 203. Specifically, as shown in FIG. 9, each pixel region 203 includes a first division region 208 and second division region 209 having respective liquid crystal alignments. Thus, the liquid crystal alignment of the panel 1 is varied along the first imaginary line 202 by the projection 45. The liquid crystal alignment patterns of the division regions 208 and 209 are not mirror patterns with respect to the first and second imaginary lines 202 and 204. However, the liquid crystal alignment pattern of each pixel region 203 is rotationally symmetrical with respect to the intersection of the first and second imaginary lines 202 and 204. Accordingly, as shown in FIG. 9, the liquid crystal alignment of the liquid crystal panel 1 in the display mode exhibits a preset regularity in which all the pixel regions 203 has the same liquid crystal alignment.

This enables a smooth and uniform white display as shown in FIG. 5 to be achieved in the white display mode in the liquid crystal panel 1.

In the second modification of the embodiment, the width P2 of the pixel electrode 11 is 40 μm, the height of the projection 45 is 1.5 μm, the third width B5 is 6 μm, the first angle θ1 is 80°, the second angle θ2 is 100°, and the interval between adjacent ones of the pixel electrodes 11 is 10 μm.

COMPARATIVE EXAMPLE

Referring now to FIGS. 10 and 11, a description will be given of a comparative example. As shown in FIG. 10, a pixel electrode 11 in the comparative example is rectangular, long in the first direction A1. A projection 46 has a shape of a thin stripe, long in the second direction A2 perpendicular to the first direction A1. The projection 46 is defined by opposite straight lines parallel to each other, and portions of the projection corresponding to pixel regions 203 are rectangular. Accordingly, the projection portions corresponding to pixel regions 203 are line-symmetrical with respect to the first and second imaginary lines 202 and 204. Further, as shown in FIG. 10, when the liquid crystal panel 1 is seen from the counter substrate 3 side, the distance between the projection 46 and the long sides of the pixel electrode 11 is extremely shorter than that between the projection 46 and the short sides of the pixel electrode 11.

Since thus, the distance between the projection 46 and the short sides of the pixel electrode 11 is so long, the alignment stability in the first division region 208 and second division region 209 is low as can be understood from FIG. 11. Therefore, three pixel regions 2031, 2032 and 2033 in FIG. 11 exhibit different liquid crystal alignments. Specifically, the liquid crystal alignment pattern of the pixel region 2031 is line-symmetrical with respect to the first imaginary line 202, and asymmetrical with respect to the second imaginary line 204. The liquid crystal alignment pattern of each of the pixel regions 2032 and 2033 is line-symmetrical with respect to the first and second imaginary line 202 and 204, and rotationally symmetrical with respect to the intersection of the first and second imaginary lines 202 and 204.

As described above, the alignment state of each pixel region 203 is unstable, and the pixel regions 203 may have different alignment states. This makes a rough (uneven) and nonuniform white display as shown in FIG. 12 to be achieved in the white display mode in the liquid crystal panel 1.

SECOND EMBODIMENT

Referring then to FIGS. 13 and 14, a second embodiment will be described. As shown in FIG. 13, pixel electrodes 111 are provided on the array substrate 2 (not shown). A projection 47 is provided on the counter substrate 3 (not shown). Each pixel electrode 111 is thin and long in the first direction A1, and the projection 47 is a stripe member thin and long in the second direction A2. The projection 47 is provided to divide each pixel electrode 111 into two equal portions in the longitudinal direction thereof, overlapping with substantially the central portion of each pixel electrode 111 with the liquid crystal layer 4 (not shown) interposed therebetween. As described above, the first imaginary line 202 extends in the second direction 2A and passes through the longitudinal center of the projection 47. Further, the first imaginary line 202 passes through the centers of the opposite long sides of each pixel electrode 111 to thereby divide it into two equal portions.

Each pixel electrode 111 includes a first rectangular pixel electrode region 112 located above the first imaginary line 202 in FIG. 13, and a second rectangular pixel electrode region 113 located below the first imaginary line 202 in FIG. 13. The first and second pixel electrode regions 112 and 113 are slightly displaced from each other in the second direction A2. At the position at which each pixel electrode 111 intersects the first imaginary line 202, i.e., at the longitudinally central portion, each pixel electrode 111 has stepped portions 111A and 111B.

Adjacent pixel electrodes 111 are arranged such that different distances E1 and E2 are alternately defined between the first pixel electrode regions 112, and the distances E2 and E1 are alternately defined between the second pixel electrode regions 113.

The pixel electrodes adjacent in the second direction 2A are formed as mirror patterns. More specifically, each pixel electrode 111 and another pixel electrode adjacent thereto in the second direction A2 are formed as mirror patterns with respect to the boundary line therebetween. Further, each pixel electrode 111 is asymmetrical with respect to the imaginary line 202 and rotationally symmetrical with respect to the intersection of the imaginary-line 202 and a fourth imaginary line 210.

In the wider region (E1 or E2) between each pair of adjacent pixel electrodes 111, the tilted electric field generated by the long sides of the electrodes effectively exerts upon the liquid crystal alignment to align the liquid crystal molecules in the direction perpendicular to the long sides of the electrodes 111.

In contrast, in the narrower region (E2 or E1) between each pair of adjacent pixel electrodes 111, the tilted electric field is hard to occur, and hence the liquid crystal molecules are aligned parallel to the long sides of the pixel electrodes 111.

Since wider and narrower regions are alternately defined between the adjacent pixel electrodes 111 in the first and second directions A1 and A2, the liquid crystal alignment pattern of the first division region 208 corresponding to the first pixel electrode region 112, and that of the second division region 209 corresponding to the second pixel electrode region 113 are not formed as mirror patterns with respect to the first imaginary line 202, as is shown in FIG. 14. Further, the liquid crystal alignment patterns of the first and second division regions 208 and 209 are asymmetrical with respect to the fourth imaginary line 210 that passes through each pixel electrode 111. The liquid crystal alignment pattern of each pixel region 203 is rotationally symmetrical with respect to the intersection of the first and fourth imaginary lines 202 and 210.

Accordingly, as shown in FIG. 14, the alignment state of the liquid crystal display panel 1 in the display mode has a preset regularity in which the liquid crystal alignment patterns of the adjacent pixel regions 203 are formed as mirror patterns with respect to their respective boundaries. This enables a smooth and uniform white display as shown in FIG. 5 to be achieved in the white display mode in the liquid crystal panel 1.

In the second embodiment, it is preferable that the width P3 of each pixel electrode 111 is 25 μm, the wider interval between each pair of adjacent pixel electrodes 111 is 6 μm or more, and the narrower interval therebetween is 5 μm or less. In particular, in a high-definition liquid crystal panel in which the width P3 of each pixel electrode 111 is less than 40 μm, the highest advantage can be acquired even from the performance of general TFT manufacturing equipment, if the wider interval is set to 8±2 μm and the narrow intervals is set to 4±1 μm.

Modification of the Second Embodiment

Referring to FIGS. 15 and 16, a description will be given of a modification of the second embodiment. As shown in FIG. 15, each pixel electrode 121 comprises, like the pixel electrode 111, a first pixel electrode region 122 located above the first imaginary line 202, and a second pixel electrode region 123 located below the first imaginary line 202. It also comprises stepped portions 121A and 121B at the location where it intersects the imaginary line 202. A projection 48 has a slim stripe shape and is located at the center of each pixel electrode 121 that extends in the first direction A1. Wider regions (E1) and narrower regions (E2) are alternately defined between each pair of adjacent pixel electrodes 121 in the first and second directions A1 and A2.

The pixel electrode 121 differs from the pixel electrode 111 in that in the former, the width P4 of the electrode 121 is 40 μm greater than the width P3 of the pixel electrode 111, the height of the projection 48 is 1.5 μm, the narrower interval is 4 μm, and the wider interval is 10 μm.

Thus, the wider and narrower regions are alternately defined between each pair of adjacent pixel electrodes in the first and second directions A1 and A2. This enables the liquid crystal alignment pattern of each pixel region 203 to be made asymmetrical with respect to the first imaginary line 202 and the fourth imaginary line 210 passing through the center of each pixel electrode 121, and to be made rotationally symmetrical with respect to the intersection of the first and fourth imaginary lines 202 and 210.

As a result, as shown in FIG. 16, the alignment state of the liquid crystal display panel 1 in the display mode has a preset regularity in which the liquid crystal alignment patterns of the adjacent pixel regions 203 are formed as mirror patterns with respect to their respective boundaries. This enables a smooth and uniform white display as shown in FIG. 5 to be achieved in the white display mode in the liquid crystal panel 1.

As described above, the asymmetry of the liquid crystal alignment pattern of each pixel region can be emphasized by increasing the size difference between the wider and narrower regions between adjacent pixel electrodes 121. Namely, the alignment state of each pixel region 203 can be stabilized. As a result, even when the width P4 of the pixel electrode 121 is wider than the width P3 of the pixel electrode 111 as in the modification, the alignment stability can be secured by increasing the size difference between the wider and narrower regions between adjacent pixel electrodes 121.

In the modification of the second embodiment, the distance E2 is smaller than the distance E1. Specifically, the distance E2 is more than 0 μm and not more than 4 μm. The distance E1 is not less than 8 μm, and is less than the sum of the distance E2 and twice the length of the pixel electrode 121 in the first direction A1.

THIRD EMBODIMENT

Figure 17:
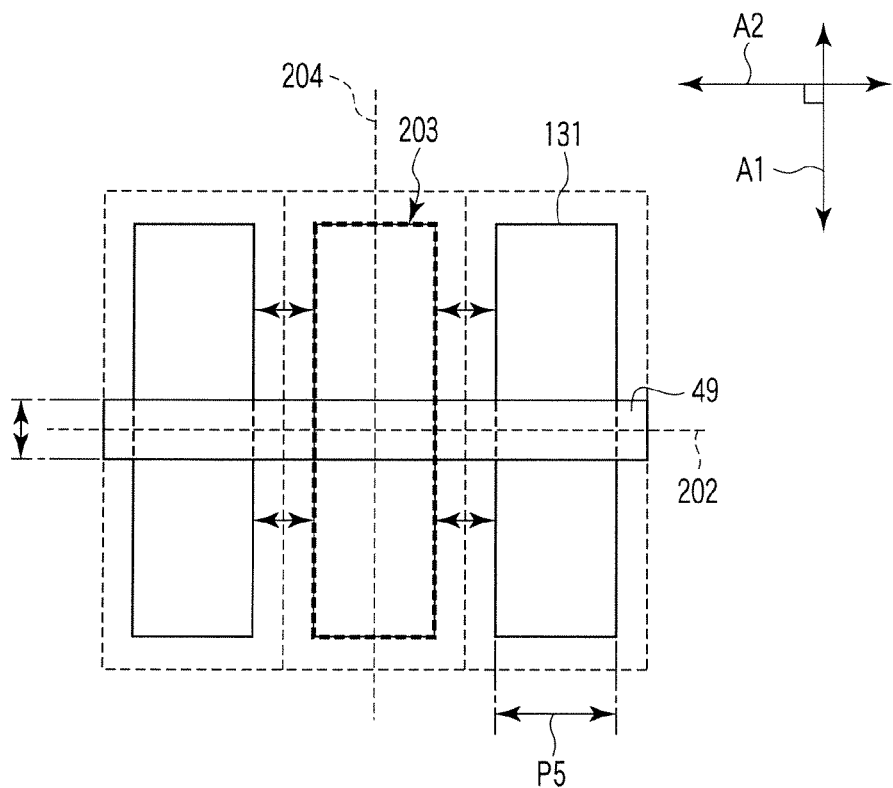
FIG. 17 is a schematic view of a liquid crystal display panel according to a third embodiment of the invention, taken from the counter substrate side.
Figure 18:
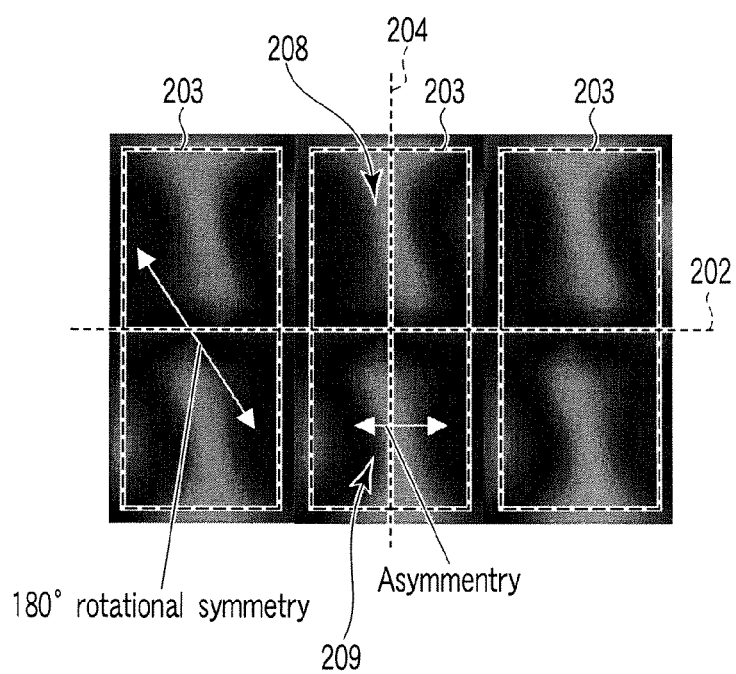
FIG. 18 is a view illustrating an alignment state of the liquid crystal display panel of FIG. 17 in the display mode.

Referring to FIGS. 17 and 18, a third embodiment of the invention will be described. As shown in FIG. 17, pixel electrodes 131 are formed on the array substrate 2 (not shown), and a projection 49 is provided on the counter substrate 3 (not shown). Each pixel electrode 131 is thin and long in the first direction A1, and the projection 49 is a stripe member thin and long in the second direction A2 that is perpendicular to the first direction A1. The projection 49 has edges parallel to each other and extending in the second direction A2. The projection 49 is provided to divide each pixel electrode 131 into two equal portions in the longitudinal direction thereof, overlapping with substantially the central portion of each pixel electrode 131 with the liquid crystal layer 4 (not shown) interposed therebetween. As described above, the first imaginary line 202 extends in the second direction 2A and passes through the longitudinal center of the projection 49. Further, the first imaginary line 202 passes through the centers of the opposite long sides of each pixel electrode 131 to thereby divide it into two equal portions. Further, the second imaginary line 204 extends in the first direction A1 and passes through the centers of the opposite short sides of each pixel electrode 131. Namely, the projection 49 and pixel electrode 131 are line-symmetrical and rotationally symmetrical with respect to the first and second imaginary lines 202 and 204, and rotationally symmetrical with respect to the intersection of the imaginary lines 202 and 204.

The array substrate 2 and counter substrate 3 constructed as above are opposed with a preset gap of, for example, 3.5 µm±0.3 µm. The peripheries of the array substrate 2 and counter substrate 3 are attached to each other using, for example, a sealing member. As a result, a cell for injecting a liquid crystal material therein is formed. A liquid crystal material (nematic liquid crystal with negative dielectric anisotropy) containing a chiral agent is sealed in the cell. The chiral agent causes the liquid crystal molecules of the liquid crystal layer 4 to have a rightward or leftward twisted structure. Thus, the liquid crystal layer 4 is held in the cell.

This being so, the liquid crystal layer 4 inherently has a twisted structure, which makes the liquid crystal alignment pattern of each pixel region 203 asymmetrical with respect to the first and second imaginary lines 202 and 204 as shown in FIG. 18. More specifically, in each pixel region 203, the liquid crystal alignment pattern of the first division region 208 located above the first imaginary line 202, and the liquid crystal alignment pattern of the second division region 209 located below the first imaginary line are not mirror patterns with respect to the first imaginary line 202 or the second imaginary line 204. The liquid crystal alignment pattern of each pixel region 203 is rotationally symmetrical with respect to the intersection of the first and second imaginary lines 202 and 204.

Accordingly, as shown in FIG. 18, the liquid crystal alignment of the liquid crystal panel 1 in the display mode exhibits a preset regularity in which all the pixel regions 203 has the same liquid crystal alignment. This enables a smooth and uniform white display as shown in FIG. 5 to be achieved in the liquid crystal panel 1 in the white display mode.

In the third embodiment, a chiral agent of a density that causes a spontaneous twist pitch of 60 µm is contained in the material of liquid crystal. Further, the width P5 of each pixel electrode 131 is set to 40 µm, the interval between each pair of adjacent pixel electrodes 131 is set to 8 µm, and the height of the projection 49 is set to 1.5 µm.

In the third embodiment, the chiral agent contained in the liquid crystal layer 4 causes the liquid crystal molecules to be twisted even if its amount is very small. Therefore, the range of amounts of the agent is not specified.

The present invention is not limited to the above-described embodiments, but may be modified in various ways without departing from the scope. Various inventions can be realized by appropriately combining the structural elements disclosed in the embodiments. For instance, some of the disclosed structural elements may be deleted. Some structural elements of different embodiments may be combined appropriately.

For instance, the first polarization control element 5 may include a half-wave plate as the first retardation film 62, in addition to the quarter-wave plate. The half-wave plate imparts a phase difference to light of a preset wavelength to thereby divide it into normal light and abnormal light. Similarly, the second polarization control element 6 may include a half-wave plate as the second retardation film 72, in addition to the quarter-wave plate. This can suppress changes in light transmissivity due to differences in wavelength. Further, to widen the viewing angle, an optical element having a negative phase difference may be added.

In addition, as described in the second modification of the first embodiment, it is preferable in the third embodiment to set the first angle θ1 within a range of not less than 80° to less than 90°, and to set the second angle θ2 within a range of more than 90° to not more than 100°. These ranges are optimal ones for reducing the rate of reduction in brightness based on the ratio of the area of the tilt control structure to the area of each pixel. As a result, the liquid crystal display device can provide high transmissivity and hence high brightness. However, the invention is not limited to these ranges. It is sufficient if the first and second angles θ1 and θ2 are set to any degrees other than 90°, and sufficient transmissivity can be secured.

Furthermore, as described in the third embodiment, the long sides of each pixel electrode 131 intersect the long sides of the projection 49 at right angles. Accordingly, both a chiral agent that causes liquid crystal molecules to be rightward twisted, and a chiral agent that causes them to be leftward twisted can be contained in the liquid crystal layer 4. However, the invention is not limited to this. For instance, the invention is also applicable to a liquid crystal display panel 1 in which the projection 45 shown in FIG. 8 is formed asymmetrical with respect to the first and second imaginary lines 202 and 204, and rotationally symmetrical. In this case, the asymmetry of the liquid crystal alignment pattern of the pixel regions 203 can be emphasized to thereby stabilize the alignment state of the pixel regions 203, using only a chiral agent having a twist property corresponding to the first angle θ1. Namely, where the linear portions of the projection 45 defined by the lines 451 and 453 are tilted as shown in FIG. 8, it is sufficient if a chiral agent having a leftward twist property is contained in the liquid crystal layer 4. This can emphasize asymmetrical liquid crystal alignment as shown in FIG. 9, thereby stabilizing the alignment state of the pixel regions 203. Accordingly, a liquid crystal display panel 1, which employs a projection having portions tilted in a direction opposite to the tilt direction in FIG. 8, should incorporate a liquid crystal layer 4 containing a chiral agent having a rightward twist property. As a result, asymmetrical liquid crystal alignment as shown in FIG. 18 can be emphasized. The liquid crystal material used in the above panels may contain a chiral agent of a density that causes a spontaneous rightward or leftward twist of 30 to 60 µm.

The TFTs employed in the embodiments are formed by stacking an a-Si or p-Si semiconductor layer and a metal layer of Al, Mo, Cr, Cu or Ta, etc. The liquid crystal display devices can utilize electrically operable elements such as the TFTs.

Further, in the embodiments, the color filter is incorporated in the counter substrate 3. However, the invention is not limited to this. For instance, a color-filter-on-array (COA) structure, in which color filter for color display is formed on the array substrate 2, may be employed. Unlike the case of incorporating color filter in the counter substrate, COA is free from the inconvenience of positioning the substrates.

Although in the embodiments, the second direction 2A is perpendicular to the first direction 1A, the invention is not limited to this. It is sufficient if they are not parallel to each other but intersect each other.

What is claimed is:

1. A liquid crystal display device comprising:
a first substrate including a first insulation substrate, and a plurality of rectangular pixel electrodes provided in a matrix on the first insulation substrate and elongated in a first direction;
a second substrate opposing the first substrate, and including a second insulation substrate, a counter electrode provided on the second insulation substrate and corresponding to the pixel electrodes, and a plurality of projections provided on the counter electrode and elongated in a second direction intersecting the first direction; and
a liquid crystal layer held between the first and second substrates,
each of the pixel electrodes being divided at a position corresponding to a corresponding one of the projections, and having a first rectangular electrode region and a second rectangular electrode region shifted from each other in the second direction,
patterns of each pair of adjacent ones of the pixel electrodes, which are adjacent in the second direction, being mirror patterns with respect to a boundary of said each pair,
said each pair having portions spaced by a first distance and portions spaced by a second distance.

2. The liquid crystal display device according to claim 1, wherein the first distance is shorter than the second distance, the first distance is longer than 0 μm and not more than 4 μm, and the second distance is not less than 8 μm and less than a sum of the first distance and twice a length of each of the pixel electrodes in the second direction.

3. The liquid crystal display device according to claim 1, wherein the patterns of said each pair of adjacent ones of the pixel electrodes are not mirror patterns with respect to an imaginary line extending in the second direction in which the projections are elongated.

4. The liquid crystal display device according to claim 1, wherein the first and second directions are perpendicular to each other, and the pixel electrodes are formed rotationally symmetrical with respect to respective axes the pixel electrodes.

* * * * *